United States Patent
Nilsson et al.

(10) Patent No.: US 10,623,080 B2
(45) Date of Patent: Apr. 14, 2020

(54) SELECTION OF BEAM FOR RECEPTION OF SIGNALS

(71) Applicant: Telefonaktiebolaget LM Ericsson (publ), Stockholm (SE)

(72) Inventors: Andreas Nilsson, Göteborg (SE); Mattias Frenne, Uppsala (SE); Anders Landström, Boden (SE); Arne Simonsson, Gammelstad (SE)

(73) Assignee: Telefonaktiebolaget LM Ericsson (Publ) (SE)

(*) Notice: Subject to any disclaimer, the term of this patent is extended or adjusted under 35 U.S.C. 154(b) by 452 days.

(21) Appl. No.: 15/531,668

(22) PCT Filed: May 9, 2017

(86) PCT No.: PCT/EP2017/060982
§ 371 (c)(1),
(2) Date: May 30, 2017

(87) PCT Pub. No.: WO2018/206082
PCT Pub. Date: Nov. 15, 2018

(65) Prior Publication Data
US 2019/0386734 A1    Dec. 19, 2019

(51) Int. Cl.
*H04B 7/08* (2006.01)
*H04B 7/0408* (2017.01)

(52) U.S. Cl.
CPC ........... *H04B 7/088* (2013.01); *H04B 7/0408* (2013.01); *H04B 7/086* (2013.01); *H04B 7/0814* (2013.01); *H04B 7/0897* (2013.01)

(58) Field of Classification Search
CPC .... H04B 7/088; H04B 7/0408; H04B 7/0814; H04B 7/0897; H04B 7/086
See application file for complete search history.

(56) References Cited

U.S. PATENT DOCUMENTS

| | | | |
|---|---|---|---|
| 2013/0121185 A1 | 5/2013 | Li et al. | |
| 2015/0249929 A1* | 9/2015 | Irie | H04B 7/0695 370/329 |
| 2015/0341095 A1 | 11/2015 | Yu et al. | |

OTHER PUBLICATIONS

International Search Report and Written Opinion dated Jan. 29, 2018 for International Application No. PCT/EP2017/060982, consisting of 18 pages.

(Continued)

*Primary Examiner* — Kabir A Timory
(74) *Attorney, Agent, or Firm* — Christopher & Weisberg, P.A.

(57) ABSTRACT

There is provided mechanisms for adapting which beam to use for reception of signals. A method is performed by a receiving radio transceiver device. The receiving radio transceiver device is capable of receiving the signals using at least one beam selected from a set of beams. Each beam in the set of beams has a backup beam. The method includes receiving signals from a transmitting radio transceiver device while using a first beam selected from the set of beams. Signal receipt at a decreasing quality level while using the first beam is detected. The decreasing quality level is caused by interfering transmission from another transmitting radio transceiver device. In response thereto, a temporary switch to the backup beam of the first beam is initiated, without performing any beam training, for continued reception of signals from the transmitting radio transceiver device.

20 Claims, 4 Drawing Sheets

(56) References Cited

OTHER PUBLICATIONS

3GPP TSG RAN WG1 Meeting #88 R1-1703404; Title: "Discussion on UE triggered beam reporting for beam recovery"; Agenda item: 8.1.2.2.3; Source: CMCC; Document for: Discussion and Decision; Location and Date: Athens, Greece, Feb. 13-17, 2017, consisting of 4 pages.

3GPP TSG RAN WG1 Meeting #89 R1-1708135; Title: "Beam failure recovery"; Agenda item: 7.1.2.2.2; Source: Huawei HiSilicon; Document for: Discussion and Decision; Location and Date: Hangzhou, China, May 15-19, 2017, consisting of 9 pages.

* cited by examiner

SELECTION OF BEAM FOR RECEPTION OF SIGNALS

CROSS-REFERENCE TO RELATED APPLICATIONS

This application is a Submission Under 35 U.S.C. § 371 for U.S. National Stage Patent Application of International Application Number: PCT/EP2017/060982, filed May 9, 2017 entitled "SELECTION OF BEAM FOR RECEPTION OF SIGNALS," the entirety of which is incorporated herein by reference.

TECHNICAL FIELD

Embodiments presented herein relate to a method, a radio transceiver device, a computer program, and a computer program product for adapting which beam to use for reception of signals.

BACKGROUND

In communications networks, there may be a challenge to obtain good performance and capacity for a given communications protocol, its parameters and the physical environment in which the communications network is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at wireless devices served by the network node). A beam pair link (BPL) is defined by the beam used by the TRP (denoted TRP beam) for communicating with the wireless device and the beam used by the wireless device (denoted WD beam) for communicating with the TRP. Each of the TRP beam and the WD beam could be used for any of transmission and reception. Likewise, there could be separate BPLs for downlink communications (where the TRP beam is a transmission (TX) beam and where the WD beam is a reception (RX) beam) and uplink communications (where the TRP beam is an RX beam and where the WD beam is a TX beam).

Beam training is generally performed for each TRP TX beam, using the corresponding reference signals, in order to find suitable WD RX beams. During this WD RX beam training the wireless device finds a best WD RX beam based on received RS power or some other metric when measuring on a RS transmitted in a TRP TX beam.

The wireless devices and/or the TRP of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

In some situations the interference experienced at a wireless device will be bursty. This might be due to the use of narrow beams with high gains that might be used at high frequencies. With such high gain transmissions, an interfering beam from a non-serving TRP can cause a large degradation in signal to interference plus noise ratio (SINR). Another reason could be the use of dynamic time division duplexing (TDD), where the downlink and uplink time slots can vary individually per served wireless device. This means that for two wireless devices geographically located close to each other, one wireless device could have an uplink time slot and transmitting data while the other wireless device has a downlink time slot and hence receives data. This can lead to significant interference experienced by the receiving wireless device from the transmitting wireless device.

If a wireless device detects a sudden strong interference during reception for an initial WD RX beam, a temporary switch to another WD RX beam might improve the interference situation. However, if there is analog beamforming in the wireless device it might take too long time to search for a good alternative WD RX beam using the above disclosed beam training, which might further degrade the performance.

Hence, there is still a need for an improved handling of interference at a receiving radio transceiver device.

SUMMARY

An object of embodiments herein is to provide efficient handling of interference at a receiving radio transceiver device, for example representing a wireless device.

According to a first aspect there is presented a method for adapting which beam to use for reception of signals. The method is performed by a receiving radio transceiver device. The receiving radio transceiver device is capable of receiving the signals using at least one beam selected from a set of beams. Each beam in the set of beams has a backup beam. The method comprises receiving signals from a transmitting radio transceiver device while using a first beam selected from the set of beams. The method comprises detecting that the signals are received at decreasing quality level while using the first beam. The decreasing quality level is caused by interfering transmission from another transmitting radio transceiver device. The method comprises, in response thereto, initiating a temporary switch to the backup beam of the first beam, without performing any beam training, for continued reception of signals from the transmitting radio transceiver device, thereby adapting which beam to use for reception of the signals.

According to a second aspect there is presented a radio transceiver device for adapting which beam to use for reception of signals. The radio transceiver device is capable of receiving the signals using at least one beam selected from a set of beams. Each beam in the set of beams has a backup beam. The radio transceiver device comprises processing circuitry. The processing circuitry is configured to cause the radio transceiver device to receive signals from a transmitting radio transceiver device while using a first beam selected from the set of beams. The processing circuitry is configured to cause the radio transceiver device to detect that the signals are received at decreasing quality level while using the first beam. The decreasing quality level is caused by interfering transmission from another transmitting radio transceiver device. The processing circuitry is configured to cause the radio transceiver device to, in response thereto, initiate a temporary switch to the backup beam of the first beam, without performing any beam training, for continued reception of signals from the transmitting radio transceiver device, thereby adapting which beam to use for reception of the signals.

According to a third aspect there is presented a radio transceiver device for adapting which beam to use for reception of signals. The radio transceiver device is capable of receiving the signals using at least one beam selected from a set of beams. Each beam in the set of beams has a backup beam. The radio transceiver device comprises processing circuitry and a storage medium. The storage medium stores instructions that, when executed by the processing circuitry, cause the radio transceiver device to perform operations, or steps. The operations, or steps, cause the radio transceiver device to receive signals from a transmitting radio transceiver device while using a first beam selected from the set of beams. The operations, or steps, cause the radio transceiver device to detect that the signals are received at decreasing quality level while using the first beam. The decreasing quality level is caused by interfering transmission from another transmitting radio transceiver device. The operations, or steps, cause the radio transceiver device to, in response thereto, initiate a temporary switch to the backup beam of the first beam, without performing any beam training, for continued reception of signals from the transmitting radio transceiver device, thereby adapting which beam to use for reception of the signals.

According to a fourth aspect there is presented a radio transceiver device for adapting which beam to use for reception of signals. The radio transceiver device is capable of receiving the signals using at least one beam selected from a set of beams. Each beam in the set of beams has a backup beam. The radio transceiver device comprises a receive module configured to receive signals from a transmitting radio transceiver device while using a first beam selected from the set of beams. The radio transceiver device comprises a detect module configured to detect that the signals are received at decreasing quality level while using the first beam. The decreasing quality level is caused by interfering transmission from another transmitting radio transceiver device. The radio transceiver device comprises an initiate module configured to, in response to the detect module having detected that the signals are received at decreasing quality level while using the first beam, initiate a temporary switch to the backup beam of the first beam, without performing any beam training, for continued reception of signals from the transmitting radio transceiver device, thereby adapting which beam to use for reception of the signals.

According to a fifth aspect there is presented a computer program for adapting which beam to use for reception of signals, the computer program comprising computer program code which, when run on a radio transceiver device capable of receiving the signals using at least one beam selected from a set of beams, wherein each beam in the set of beams has a backup beam, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio transceiver devices, this computer program and this computer program product provide efficient handling of interference at a receiving radio transceiver device.

Advantageously this method, these radio transceiver devices, this computer program and this computer program product enhances the downlink SINR in cases of interference and hence enhances the downlink performance for the radio transceiver device.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
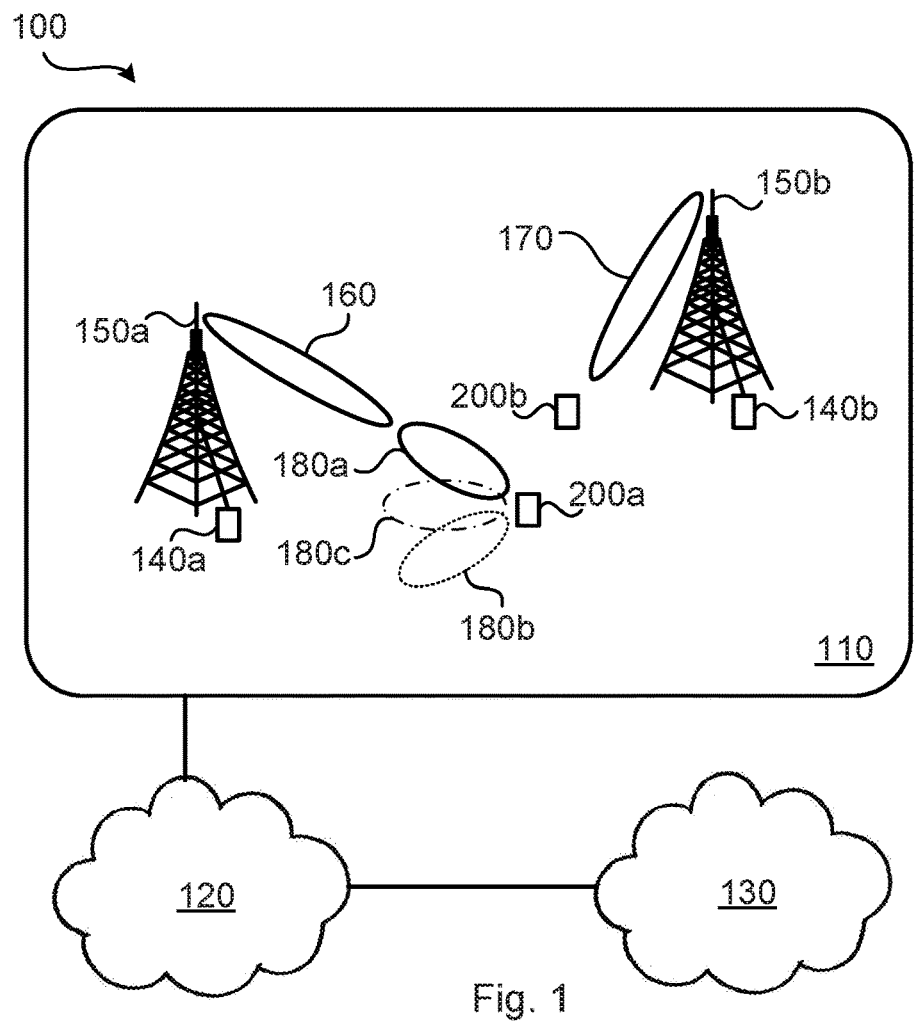
FIG. 1 is a schematic diagram illustrating a communication network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard. The communications network 100 comprises radio transceiver devices 140a, 140b that are configured to provide network access to radio transceiver devices 200a, 200b in a radio access network 110. The radio access network 110 is operatively connected to a core network 120. The core network 120 is in turn operatively connected to a service network 130, such as the Internet. The radio transceiver devices 200a, 200b are thereby, via the radio transceiver devices 140a, 140b, enabled to access services of, and exchange data with, the service network 130. The radio transceiver devices 140a, mob provide network access in the radio access network 110 by transmitting signals to, and receiving signals from, the radio transceiver devices 200a, 200b. The signals could be transmitted from, and received by, a respective TRP 150a, 150b of the radio transceiver devices 140a, 140b. Each TRP 150a, 150b could form an integral part of its radio transceiver device 140a, mob or be physically separated from its radio transceiver device 140a, 140b.

Typically the radio transceiver devices 140a, 140b are network nodes and the radio transceiver devices 200a, 200b are wireless devices. Examples of network nodes are radio access network nodes, radio base stations, base transceiver stations, Node Bs, evolved Node Bs, gigabit Node Bs, access points, and access nodes. Examples of wireless devices are mobile stations, mobile phones, handsets, wireless local loop phones, user equipment (UE), smartphones, laptop computers, tablet computers, network equipped sensors, network equipped vehicles, and so-called Internet of Things devices.

In the illustrative example of FIG. 1, radio transceiver device 200a is served by radio transceiver device 140a by a serving TRP TX beam 160 and radio transceiver device 200a uses a WD RX beam 180a for receiving signals transmitted in the serving TRP TX beam 160. Further, radio transceiver device 200b is served by radio transceiver device mob by a serving TRP TX beam 170.

In general terms, a first reference signal (RS) will be transmitted in a precoded manner in beam 160, and a second RS, which may be orthogonal to the first RS, will be transmitted in a precoded manner in beam 170. The used RS may be an RS for channel state information feedback (such as channel state information reference signals; CSI-RS), mobility measurements (mobility reference signals; MRS), synchronization reference signals or sequence (SS) or any other defined RS.

Hence, beam 170 could be, or constitute, an interferer for radio transceiver device 200a. As will be further disclosed below, radio transceiver device 200a therefore has access to one or more backup WD RX beams 180a, 180c. By switching to one of the backup beams 180a, 180c radio transceiver device 200a might be able to avoid, or at least mitigate the impact of, the interference caused by beam 170.

The embodiments disclosed herein particularly relate to mechanisms for adapting which beam to use for reception of signals. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

For ease of notation, radio transceiver device 200a will hereinafter be denoted a receiving radio transceiver device, whereas radio transceiver devices 200b, 140a, 140b hereinafter collectively will be denoted transmitting radio transceiver devices, where transmitting radio transceiver device 140a serves the receiving radio transceiver device 200a via its TRP 150a, and where transmitting radio transceiver devices 140b, 200b act as interferers to the receiving radio transceiver device 200a. For ease of notation, radio transceiver device 200a might be embodied as a terminal device and the transmitting radio transceiver device 140a embodied as a radio access network node.

However, it is to be noted that the herein disclosed embodiments can be applied at a receiving radio transceiver device 200a implemented both as a terminal device, as a radio access network node and, or even as a receiving radio transceiver device implemented as a backhauling node or a sidelink node. Thus, although the receiving radio transceiver device 200a in at least some of the herein disclosed embodiments is described as being a terminal device and the transmitting radio transceiver device 140a is described as being a radio access network node, the functionality of the herein disclosed receiving radio transceiver device 200a could equally be implemented in a radio access network node.

It is further to be noted that although the beams 160, 170, 180a-180c are drawn to have a certain form or shape, the beams 160, 170, 180a-180c are drawn for illustrative purposes only, although at least beams 160, 170, 180a-180c generally could be so-called pencil beams. How to determine the form or shape of beams 160, 170, 180a-180c may vary depending on the scenario.

It is thus to be noted that although the beams 160, 170, 180a-180c as drawn in FIG. 1 do not physically cover the devices communicated with, this is an intentional simplification made to make the FIG. 1 less cluttered.

Figure 2:
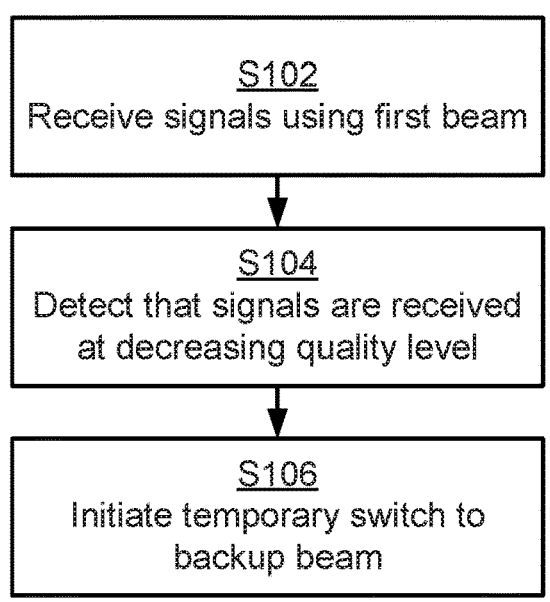
FIGS. 2 and 3 are flowcharts of methods according to embodiments.
Figure 3:
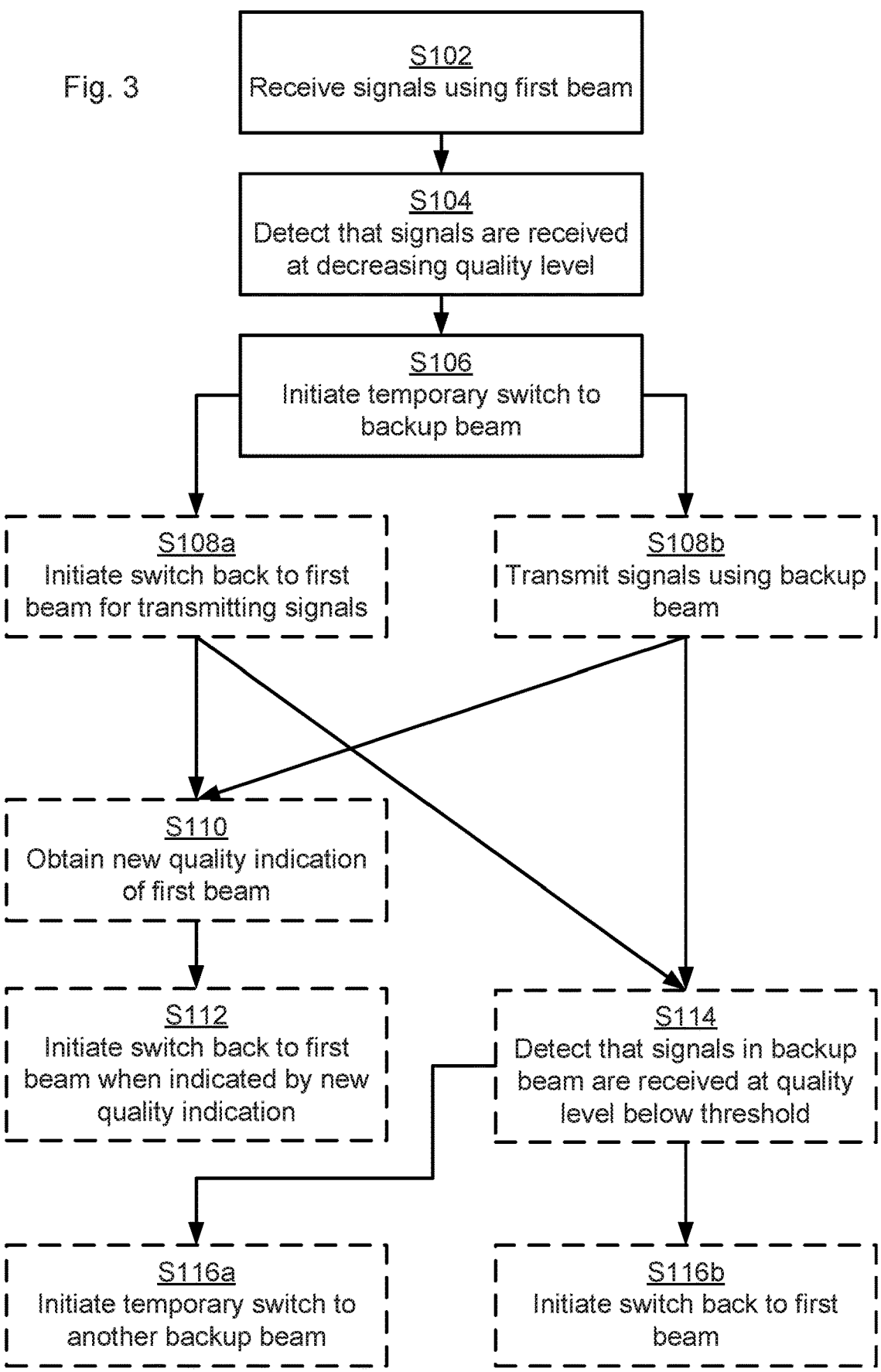

FIGS. 2 and 3 are flowcharts illustrating embodiments of methods for adapting which beam to use for reception of signals. The methods are performed by the receiving radio transceiver device 200a. The methods are advantageously provided as computer programs 720.

Reference is now made to FIG. 2 illustrating a method for adapting which beam to use for reception of signals as performed by the receiving radio transceiver device 200a according to an embodiment. The receiving radio transceiver device 200a is capable of receiving the signals using at least one beam 180a selected from a set of beams. Each beam in the set of beams has a backup beam 180b.

As disclosed above, the receiving radio transceiver device 200a is served by the transmitting radio transceiver device 140a and thus receives signals from the transmitting radio transceiver device 140a. Hence, the receiving radio transceiver device 200a is configured to perform step S102:

S102: The receiving radio transceiver device 200a receives signals from a transmitting radio transceiver device 140a while using a first beam 180a selected from the set of beams.

It is assumed that the receiving radio transceiver device 200a suddenly experiences high interference in the original WD RX beam (i.e. the first beam 180a), for example during downlink data transmissions. Particularly, the receiving radio transceiver device 200a is configured to perform step S104:

S104: The receiving radio transceiver device 200a detects that the signals are received at decreasing quality level while using the first beam 180a. The decreasing quality level is caused by interfering transmission from another transmitting radio transceiver device 140b, 200b.

The receiving radio transceiver device 200a could detect the interference (as caused by the interfering transmission) by using any available interference estimation technique. The receiving radio transceiver device 200a then switches WD RX beam from the original WD RX beam to the backup WD RX beam (i.e. the backup beam 180b) for some time. Particularly, the receiving radio transceiver device 200a is configured to perform step S106 in response to having detected that the signals are received at decreasing quality level while using the first beam 180a:

S106: The receiving radio transceiver device 200a initiates a temporary switch to the backup beam 180b of the first beam 180a for continued reception of signals from the transmitting radio transceiver device 140a. The temporary switch is made without performing any beam training. The receiving radio transceiver device 200a thereby adapts which beam to use for reception of the signals.

No signalling of the temporary switch to the backup beam 180b is needed to the transmitting radio transceiver device 140a.

Embodiments relating to further details of adapting which beam to use for reception of signals as performed by the radio transceiver device 200a will now be disclosed.

As disclosed above, the beam 180a is selected from a set of beams. In some aspects also the backup beam 180b is selected from this set of beams. However, the receiving radio transceiver device 200a is not limited to select which beam to use only from the first beam 180a and the backup beam 180b. There could be multiple beams in the set of beams for the receiving radio transceiver device 200a to select from at any given time. However, each beam in the set of beams has a backup beam and a switch to a backup beam from any of the beams in the set of beams is thus possible without performing any beam training on the fly. According to an embodiment each beam in the set of beams has its own unique backup beam 180b such that no two beams in the set of beams share a common backup beam 180b. Alternatively, there are at least two beams in the set of beams that share a common backup beam 180a.

There could be different factors, properties, or ways, according to which the backup beam 180b is selected.

In some aspects the backup WD RX beam (backup beam 180b) has low spatial correlation with the original WD RX beam (first beam 180a). That is, according to an embodiment the backup beam 180b, among all beams in the set of beams, has lowest spatial correlation with the first beam 180a.

Spatial correlation can be described in a quasi co-location (QCL) framework adopted in Long Term Evolution (LTE) telecommunications networks and extended to spatial QCL in New radio (NR) telecommunications networks.

There could be different examples of low spatial correlation.

In some aspects the beams (i.e. the first beam 180a and the backup beam 180b) differ as much as possible in angular space. That is, according to an embodiment the lowest spatial correlation corresponds to a maximum difference in pointing direction in angular space.

It could thereby be possible to select a beam as the backup WD RX beam that differs as much as possible in angular space compared to the best RX beam (defining the original WD RX beam).

Another example is to select a backup WD RX beam with least overlap in its antenna diagram with the original WD RX beam. In some aspects the beams (i.e. the first beam 180a and the backup beam 180b) thus have least comparative overlap in antenna diagram space. That is, according to an embodiment the lowest spatial correlation corresponds to a minimum overlap in antenna diagram space.

The least comparative overlap could be defined as largest Half Power Beam Width (HPBW) separation. The least comparative overlap could also be largest beam gain difference integrated over the whole sphere or a selected angle-range. Denote by $G_{prim}$ the gain of the original beam and $G_{bix}$ the gain of a (candidate) backup beam with beam index bix. The backup beam 180b is then selected as the beam with the beam index that minimizes the integrated gain difference. That is, the backup beam 180b could be selected as follows:

$$\underset{bix}{\operatorname{argmin}} \int_0^{2\pi} \int_0^{2\pi} G_{prim} - G_{bix}$$

It might be so that the backup beam with largest angular separation, or overlap, to the first beam 180a has comparatively low received power such that the downlink performance will be significantly reduced if this backup beam used. In this case it might be advantageous to select as backup beam the beam that is closer in angular space to the first beam 180a but with high received power. In some aspects it is thus conditioned that the backup beam 180b has sufficiently high received power or quality compared to first beam 180a. Particularly, according to an embodiment the backup beam 180b is selected from the set of beams as constrained to those of the beams having an estimated reference signal received power (RSRP) value or channel quality indication (CQI) value being within a threshold distance to that of the first beam 180a. This enables a trade-off between beam separation on the one hand and RSRP/CQI on the other hand.

The threshold distance could be selected such that the backup beam is selected with as large angular separation as possible to the first beam 180a but with the additional requirement that the RSRP or CQI is within the threshold distance to that of the first beam 180a. The threshold distance could be an absolute value or be relative to the first beam 180a or relative to other candidate backup beams. The threshold distance could be a configurable parameter, e.g. set by higher layer signaling such as radio resource control (RRC) signaling, or it can be fixed in a specification. As an example, the receiving radio transceiver device 200a could store all backup beams which are at most 5-15 dB, such as 10 dB, weaker in a metric, such as RSRP, than the first beam 180a. The backup beams could be indexed in sorted tables of beam candidates. For this purpose the receiving radio transceiver device 200a could have access to a table indexing which antenna elements and/or which analog beam configuration to use for each backup beam.

In some aspects which beam, or set of beams, to use as backup beam is determined during (previous) regular reception or dedicated beam training. That is, according to an embodiment, which of the beams in the set of beams to use as backup beam 180b for the first beam 180a is determined during regular reception of data transmission from the transmitting radio transceiver device 140a and/or dedicated beam training of the receiving radio transceiver device 200a.

The beam training as disclosed above, where a WD RX beam is selected for each TRP TX beam, could be extended such that a backup WD RX beam for the original WD RX beam is determined when measuring on the RS transmitted using the same TRP TX beam as for the original WD RX beam.

There could be different types of signals that are received from the transmitting radio transceiver device 140a in step S102. According to an embodiment the signals received from the transmitting radio transceiver device 140a represent data transmission to the receiving radio transceiver device 200a.

In some aspects the high interference experienced at the receiving radio transceiver device 200a is caused by downlink transmission (from a transmitting radio transceiver device mob being a radio access network node, or the TRP 150*b* of the radio access network node). In other aspects the interference is caused by uplink transmission (from a transmitting radio transceiver device 200*b* being a wireless device), for example in case of dynamic TDD.

Some of the above embodiments have been disclosed in a context of a single receiver branch, resulting in a single backup beam 180*b* being selected. This basic principle can be expanded to multiple receiver branches and multiple WD RX beams. For a receiving radio transceiver device 200*a* comprising at least two receiver branches, spatial multiplexing and interference suppression diversity can be taken into account selecting backup beam and number of layers received. In some aspects the receiving radio transceiver device 200*a* is configured to simultaneously use two beams for reception. Then one of the beams can be used for interference suppression. Particularly, according to an embodiment the signals from the transmitting radio transceiver device 140*a* received using the first beam 180*a* are simultaneously received using a second beam 180*c* selected from the set of beams. The second beam 180*c* could then be used for interference suppression of the interfering transmission from at least one of the so-called another transmitting radio transceiver device 140*b*, 200*b*.

According to further embodiments where the signals from the transmitting radio transceiver device 140*a* received using the first beam 180*a* are simultaneously received using a second beam 180*c* selected from the set of beams, the temporary switch could be initiated when the signals received using at least the first beam 180*a* are received at decreasing quality level.

According to further embodiments where the first beam 180*a* has at least two backup beams 180*b*, 180*c* to select from, the temporary switch is made to a first backup beam 180*b* of the at least two backup beams 180*b*, 180*c*.

According to an embodiment the receiving radio transceiver device 200*a* is configured to receive the signals using any of the beams 180*a*, 180*b*, 180*c* by means of analog beamforming or hybrid beamforming.

In further detail, in the case of hybrid beamforming with interference suppression (such as for a minimum mean squared error (MMSE) receiver) interference suppression diversity could be taken into account when selecting which beam to use as backup beam. Also, it may be sufficient to only switch one of the antenna branches to the backup beam 180*b* to mitigate the sudden interference, thus maintaining at least one of the antenna branches on the first beam 180*a*. The backup beam 180*b* could then be selected as giving the most robust interference mitigation, given the receiver algorithm, such as MMSE or Successive Interference Cancellation (SIC).

For spatial multiplexing using multiple input multiple output (MIMO) the received rank can be reduced and only reception of some codewords (thus ignoring and sacrificing other codewords) can be targeted. For example, if two codewords are to be received on rank 4 with 4 receiver branches, only one codeword might actually be received, with two of the antenna branches being utilized for interference suppression. The sacrificed codeword(s) could then blindly be negatively acknowledged (NACKed) and if the interference burst is short, hybrid automatic repeat request (HARQ) retransmission might make the transmission seamless from a user perspective.

Reference is now made to FIG. 3 illustrating methods for adapting which beam to use for reception of signals as performed by the radio transceiver device 200*a* according to further embodiments. It is assumed that steps S102, S104, S106 are performed as described above with reference to FIG. 2 and a thus repeated description thereof is therefore omitted.

In case the receiving radio transceiver device 200*a* uses the same beam for both downlink reception and uplink transmission (i.e. the beam is both used as a WD RX beam and a WD TX beam), the receiving radio transceiver device 200*a* could switch back to the original beam (i.e. the first beam 180*a*) again for the next uplink transmission in order to minimize the risk of deteriorating the uplink performance. Hence, according to an embodiment the first beam 180*a* is also intended to be used for transmitting signals from the receiving radio transceiver device 200*a* to the transmitting radio transceiver device 140*a*. In such an embodiment the receiving radio transceiver device 200*a* is configured to perform (optional) step S108*a*:

S108*a*: The receiving radio transceiver device 200*a* initiates a switch back to the first beam 180*a* for transmitting the signals to the transmitting radio transceiver device 140*a*.

Once having transmitted the signals to the transmitting radio transceiver device 140*a* a switch is again initiated to the backup beam 180*b*.

In other aspects the same beam (i.e. the backup beam 180*b*) could also be used for uplink transmission. That is, according to another embodiment where the first beam 180*a* is also intended to be used for transmitting signals from the receiving radio transceiver device 200*a* to the transmitting radio transceiver device 140*a* the receiving radio transceiver device 200*a* is configured to perform (optional) step S108*b*:

S108*b*: The receiving radio transceiver device 200*a* transmits the signals to the transmitting radio transceiver device 140*a* using the backup beam 180*a*.

There could be different ways for the receiving radio transceiver device 200*a* for determine when to switch back to the original WD RX beam (i.e. beam 180*a*).

In some aspects the receiving radio transceiver device 200*a* now and then measures on the first beam 180*a*, for example when not scheduled for transmission or reception. For example, the receiving radio transceiver device 200*a* could during orthogonal frequency-division multiplexing (OFDM) symbols where no data transmission is expected from the serving transmitting radio transceiver device 140*a* quickly switch back to the original WD RX beam to check if there is still interference. Particularly, according to an embodiment the signals received in step S102 using the first beam 180*a* are received at a first quality level before it is detected that the signals are received at decreasing quality level. The receiving radio transceiver device 200*a* is then configured to perform (optional) step S110:

S110: The receiving radio transceiver device 200*a* obtains, when scheduled neither to receive signals from the transmitting radio transceiver device 140*a* nor to transmit signals to the transmitting radio transceiver device 140*a*, and either periodically, semi-periodically, or aperiodically, a new quality indication of the first beam 180*a*.

If the quality indication indicates that the quality is restored (such as when the interference is gone), the receiving radio transceiver device 200*a* can switch back to the previously best (original) WD RX beam again. The receiving radio transceiver device 200*a* could thus be configured to perform (optional) step S112:

S112: The receiving radio transceiver device 200*a* initiates a switch back to the first beam 180*a* for continued reception of signals from the transmitting radio transceiver device 140*a* only when the new quality indication is at a second quality level, where the second quality level is within a threshold distance to the first quality level. It could even be that the second quality level is identical to the first quality level, thus resulting in a switch back to the first beam 180a only when the quality has been completely restored.

In some aspects an additional condition is that a switch back to the first beam 180a for continued reception of signals from the transmitting radio transceiver device 140a only is made at the end of a scheduled transmission to the receiving radio transceiver device 200a. In further aspects a switch back to the first beam 180a for continued reception of signals from the transmitting radio transceiver device 140a is made at the end of a scheduled transmission to the receiving radio transceiver device 200a, regardless of whether the second quality level is within the threshold distance to the first quality level. This is under the assumption that the interference only lasts as long as the current scheduled transmission to the receiving radio transceiver device 200a. The scheduled transmission to the receiving radio transceiver device 200a could be defined by a set of data packages, or even a single data package, sent to the receiving radio transceiver device 200a.

In some aspects a switch back to the first beam 180a (or to another backup beam 180c) is made if the performance (for example SINR) for the backup beam 180b is poor (such that when the performance for the backup beam 180b is worse than for the first beam 180a for which interference is experienced). In this respect the receiving radio transceiver device 200a could be configured to evaluate if the performance is better for the backup beam 180b compared to the first beam 180b or another backup beam 180c. Particularly, according to an embodiment the receiving radio transceiver device 200a is configured to perform (optional) step S114:

S114: The receiving radio transceiver device 200a detects, when the signals are received using the backup beam 180b, that that the signals are received at a quality level being below a threshold value for the backup beam 180a.

In response to having detected that that the signals are received at a quality level being below this threshold value the receiving radio transceiver device 200a performs one of steps S116a and S116b:

S116a: The receiving radio transceiver device 200a initiates a temporary switch to another backup beam 180c of the first beam 180a for continued reception of signals from the transmitting radio transceiver device 140a. This temporary switch is made without performing any beam training.

S116b: The receiving radio transceiver device 200a initiates a switch back to the first beam 180a for continued reception of signals from the transmitting radio transceiver device 140a.

Neither step S116a nor step S116b requires any signalling to the transmitting radio transceiver device 140a regarding the beam switch.

Figure 4:
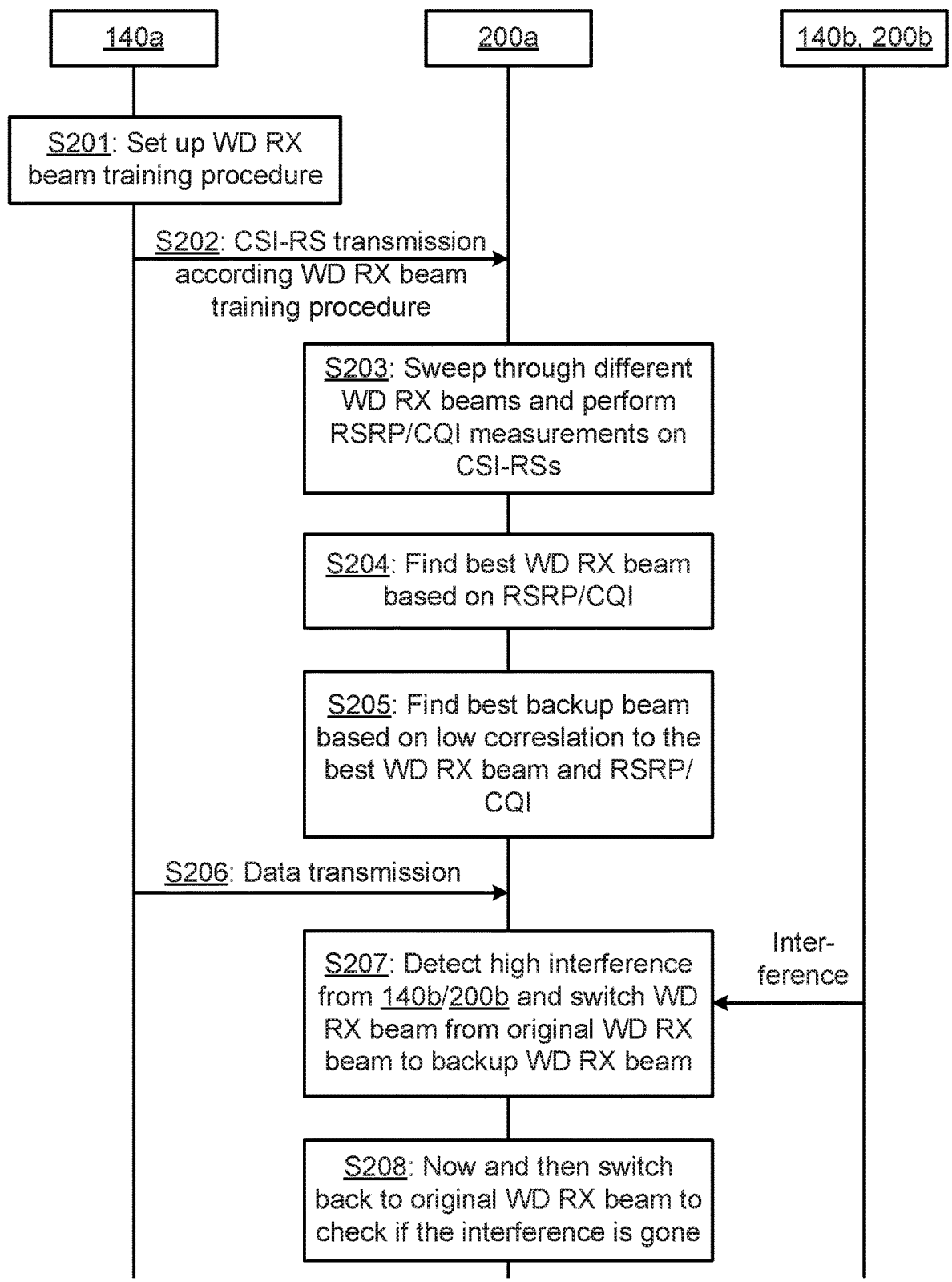
FIG. 4 is a signalling diagram of a method according to an embodiment.

One particular embodiment for adapting which beam to use for reception of signals based on at least some of the above disclosed embodiments will now be disclosed with reference signal to the signalling diagram of FIG. 4.

S201: The transmitting radio transceiver device 140a sets up a WD RX beam training procedure for the receiving radio transceiver device 200a to optimize the WD RX beam.

S202: The transmitting radio transceiver device 140a transmits CSI-RS, MRS or some other signal that defines the beam, repeatedly in the same TRP TX beam according to the WD RX beam training procedure.

S203: The receiving radio transceiver device 200a sweeps through different WD RX beams and performs RSRP measurements for each WD RX beam.

S204: The receiving radio transceiver device 200a finds a best WD RX beam with the highest RSRP and/or CQI. This best WD RX beam defines the original WD RX beams (i.e. the first beam 180a).

S205: The receiving radio transceiver device 200a finds a suitable backup WD RX beam (i.e. backup beam 180b), given the particular best WD RX beam selected in step S204. The backup beam is thus selected by analyzing the RSRP and/or CQI of the WD RX beams and their spatial correlation to the selected best WD RX beam.

S206: The transmitting radio transceiver device 140a transmits data to the receiving radio transceiver device 200a, and the receiving radio transceiver device 200a receives the data using the original WD RX beam (i.e. the first beam 180a). One way to implement step S206 is to perform step S102.

S207: The receiving radio transceiver device 200a experiences a quality degradation caused by high interference from another transmitting radio transceiver device 140b, 200b. One way to implement step S207 is to perform step S104.

S208: The receiving radio transceiver device 200a initiates a switch from the original WD RX beam (i.e. the first beam 180a) to the backup WD RX beam (i.e. backup beam 180b). The receiving radio transceiver device 200a evaluates if the performance (for example SINR) is better for the backup WD RX beam compared to the original WD RX beam. If so, the receiving radio transceiver device 200a continues the reception using the backup WD RX beam. One way to implement step S208 is to perform step S106, possibly in combination with any of steps S108a, S108b.

S209: The receiving radio transceiver device 200a, now and then, for example during OFDM symbols where no data transmission is expected from the transmitting radio transceiver device 140a, quickly switches back to the original WD RX beam to check if the interference is still there. If the interference is gone, the receiving radio transceiver device 200a terminates the temporary switch to the backup WD RX beam and uses the original WD RX beam again for reception of the data from the transmitting radio transceiver device 140a. One way to implement step S209 is to perform step S110, possibly in combination with step S112.

In summary, in accordance with at least some of the herein disclosed embodiments the receiving radio transceiver device 200a saves backup WD RX beams which have low spatial correlation, or are not spatially QCL on the WD RX side with the original WD RX beam, possibly conditioned by RSRP/CQI. When the receiving radio transceiver device 200a experiences high interference in the original WD RX beam, the receiving radio transceiver device 200a switches to the backup WD RX beam and evaluates if the performance is better there. If the performance is better the receiving radio transceiver device 200a, now and then during coming OFDM symbols without data transmissions from the transmitting radio transceiver device 140a, evaluates the original WD RX beam to investigate if the interference has dropped, and if the receiving radio transceiver device 200a should switch back to the original WD RX beam for continued reception of the data from the transmitting radio transceiver device 140a.

Figure 5:
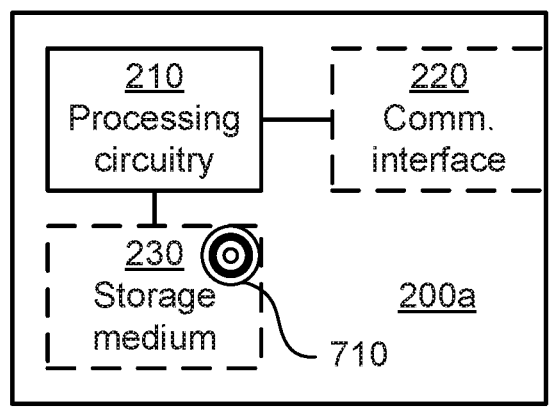
FIG. 5 is a schematic diagram showing functional units of a radio transceiver device according to an embodiment.

FIG. 5 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a to perform a set of operations, or steps, S102-S116b, as disclosed above. For example, the storage medium 230 may store the set of operations, and the processing circuitry 210 may be configured to retrieve the set of operations from the storage medium 230 to cause the radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a may further comprise a communications interface 220 at least configured for communications with other nodes, functions, entities, and devices in the communications network 100, and particularly the transmitting radio transceiver device 140a. As such the communications interface 220 may comprise one or more transmitters and receivers, comprising analogue and digital components. The processing circuitry 210 controls the general operation of the radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a are omitted in order not to obscure the concepts presented herein.

Figure 6:
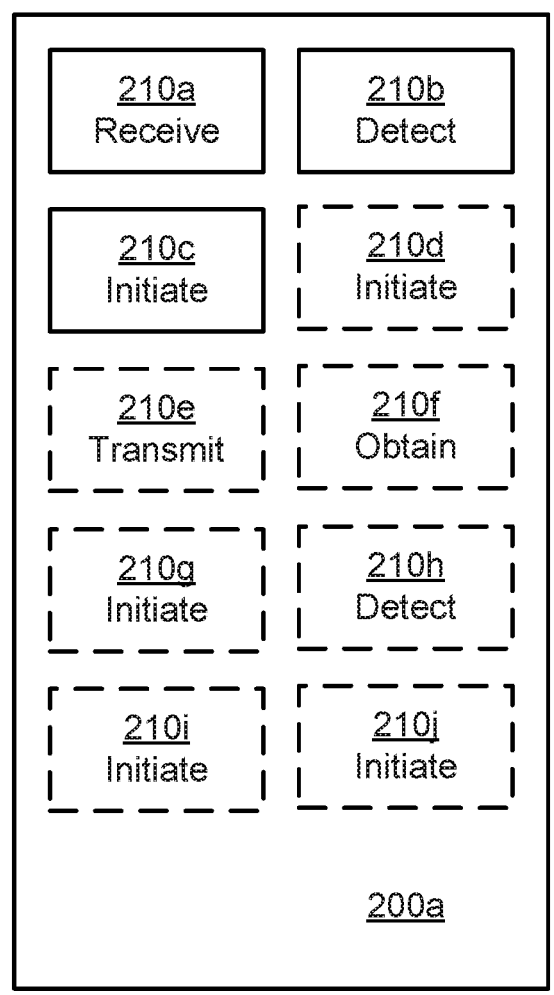
FIG. 6 is a schematic diagram showing functional modules of a radio transceiver device according to an embodiment.

FIG. 6 schematically illustrates, in terms of a number of functional modules, the components of a radio transceiver device 200a according to an embodiment. The radio transceiver device 200a of FIG. 6 comprises a number of functional modules; a receive module 210a configured to perform step S102, a detect module 210b configured to perform step S104, and an initiate module 210C configured to perform step S106. The radio transceiver device 200a of FIG. 6 may further comprise a number of optional functional modules, such as any of an initiate module 210d configured to perform step S108a, a transmit module 210e configured to perform step S108b, an obtain module 210f configured to perform step S110, an initiate module 210g configured to perform step S112, a detect module 210h configured to perform step S114, an initiate module 210i configured to perform step S116a, and an initiate module 210j configured to perform step S116b.

In general terms, each functional module 210a-210j may in one embodiment be implemented only in hardware and in another embodiment with the help of software, i.e., the latter embodiment having computer program instructions stored on the storage medium 230 which when run on the processing circuitry makes the radio transceiver device 200a perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210j may be implemented by the processing circuitry 210, possibly in cooperation with the communications interface 220 and/or the storage medium 230. The processing circuitry 210 may thus be configured to from the storage medium 230 fetch instructions as provided by a functional module 210a-210j and to execute these instructions, thereby performing any steps as disclosed herein.

Figure 7:
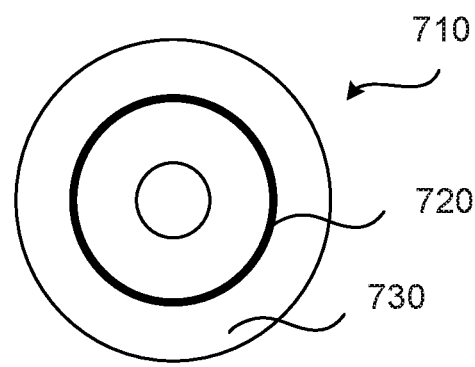
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adapting which beam to use for reception of signals, the method being performed by a receiving radio transceiver device, the receiving radio transceiver device being configured to receive the signals using at least one beam selected from a set of beams, each beam in the set of beams having a backup beam, the method comprising:
receiving signals from a transmitting radio transceiver device while using a first beam selected from the set of beams;
detecting that the signals are received at decreasing quality level while using the first beam, the decreasing quality level being caused by interfering transmission from another transmitting radio transceiver device; and
in response thereto:
initiating a temporary switch to the backup beam of the first beam, without performing any beam training, for continued reception of signals from the transmitting radio transceiver device, thereby adapting which beam to use for reception of the signals.

2. The method according to claim 1, wherein the backup beam, among all beams in the set of beams, has lowest spatial correlation with the first beam.

3. The method according to claim 2, wherein the lowest spatial correlation corresponds to a maximum difference in pointing direction in angular space.

4. The method according to claim 2, wherein the lowest spatial correlation corresponds to a minimum overlap in antenna diagram space.

5. The method according to claim 1, wherein the backup beam is selected from the set of beams as constrained to those of the beams having one of an estimated reference signal received power value and channel quality indication value being within a threshold distance to that of the first beam.

6. The method according to claim 1, wherein the first beam also is usable for transmitting signals from the receiving radio transceiver device to the transmitting radio transceiver device, the method further comprising:
  initiating a switch back to the first beam for transmitting the signals to the transmitting radio transceiver device.

7. The method according to claim 1, wherein the first beam also is usable for transmitting signals from the receiving radio transceiver device to the transmitting radio transceiver device, the method further comprising:
  transmitting the signals to the transmitting radio transceiver device using the backup beam.

8. The method according to claim 1, wherein each beam in the set of beams has its own unique backup beam such that no two beams in the set of beams share a common backup beam.

9. The method according to claim 1, wherein at least two beams in the set of beams share a common backup beam.

10. The method according to claim 1, wherein the signals received using the first beam are received at a first quality level before detecting that the signals are received at decreasing quality level, the method further comprising:
  obtaining, when scheduled neither to receive signals from the transmitting radio transceiver device nor to transmit signals to the transmitting radio transceiver device, and one of either periodically, semi-periodically, and aperiodically, a new quality indication of the first beam; and
  initiating a switch back to the first beam for continued reception of signals from the transmitting radio transceiver device only when the new quality indication is at a second quality level being within a threshold distance to the first quality level.

11. The method according to claim 1, wherein which of the beams in the set of beams to use as backup beam for the first beam is determined during at least one of regular reception of data transmission from the transmitting radio transceiver device and dedicated beam training of the receiving radio transceiver device.

12. The method according to claim 1, wherein the first beam has at least two backup beams to select from, and wherein the temporary switch is made to a first backup beam of the at least two backup beams.

13. The method according to claim 1, further comprising:
  detecting, when the signals are received using the backup beam, that that the signals are received at a quality level being below a threshold value for the backup beam; and
  in response thereto one of:
    initiating a temporary switch to another backup beam of the first beam, without performing any beam training, for continued reception of signals from the transmitting radio transceiver device; and
    initiating a switch back to the first beam for continued reception of signals from the transmitting radio transceiver device.

14. The method according to claim 1, wherein the receiving radio transceiver device is configured to receive the signals using the at least one beam by one of analog beamforming and hybrid beamforming.

15. The method according to claim 1, wherein the signals received from the transmitting radio transceiver device represent data transmission to the receiving radio transceiver device.

16. The method according to claim 1, wherein the signals from the transmitting radio transceiver device received using the first beam are simultaneously received using a second beam selected from the set of beams, and wherein the second beam is used for interference suppression of the interfering transmission from said another transmitting radio transceiver device.

17. The method according to claim 1, wherein the signals from the transmitting radio transceiver device received using the first beam are simultaneously received using a second beam selected from the set of beams, and wherein the temporary switch is initiated when the signals received using at least the first beam are received at decreasing quality level.

18. The method according to claim 1, wherein the receiving radio transceiver device is a terminal device and wherein the transmitting radio transceiver device is a radio access network node.

19. A radio transceiver device for adapting which beam to use for reception of signals, the radio transceiver device being configured to receive the signals using at least one beam selected from a set of beams, each beam in the set of beams having a backup beam, the radio transceiver device comprising:
  processing circuitry; and
  a storage medium storing instructions that, when executed by the processing circuitry, cause the radio transceiver device to:
    receive signals from a transmitting radio transceiver device while using a first beam selected from the set of beams;
    detect that the signals are received at decreasing quality level while using the first beam, the decreasing quality level being caused by interfering transmission from another transmitting radio transceiver device; and
  in response thereto:
    initiate a temporary switch to the backup beam of the first beam, without performing any beam training, for continued reception of signals from the transmitting radio transceiver device thereby adapting which beam to use for reception of the signals.

20. A non-transitory computer storage medium for adapting which beam to use for reception of signals, the non-transitory computer storage medium storing computer code which, when run on processing circuitry of a radio transceiver device configured to receive the signals using at least one beam selected from a set of beams, each beam in the set of beams having a backup beam, causes the radio transceiver device to:
  receive signals from a transmitting radio transceiver device while using a first beam selected from the set of beams;
  detect that the signals are received at decreasing quality level while using the first beam, the decreasing quality level being caused by interfering transmission from another transmitting radio transceiver device; and
  in response thereto:
    initiate a temporary switch to the backup beam of the first beam, without performing any beam training, for continued reception of signals from the transmitting radio transceiver device, thereby adapting which beam to use for reception of the signals.

* * * * *